United States Patent [19]

Fukuda et al.

[11] 4,420,653
[45] Dec. 13, 1983

[54] HIGH CAPACITANCE BUS BAR AND METHOD OF MANUFACTURE THEREOF

[75] Inventors: Sunichi Fukuda, Kukizaki; Masaaki Muto, Ryugasaki, both of Japan

[73] Assignee: Rogers Corporation, Rogers, Conn.

[21] Appl. No.: 154,376

[22] Filed: May 29, 1980

[51] Int. Cl.³ .............................................. H01B 7/08
[52] U.S. Cl. .................................. 174/72 B; 29/825; 156/47
[58] Field of Search ............... 174/72 B; 29/25.41, 29/25.42, 825, 832; 156/47, 55; 361/306

[56] References Cited

U.S. PATENT DOCUMENTS

| | | | |
|---|---|---|---|
| 3,708,610 | 1/1973 | Kozel et al. | 174/72 B |
| 3,778,735 | 12/1973 | Steenmetser | 174/72 B UX |
| 4,236,046 | 11/1980 | De Vries | 174/72 B |
| 4,266,091 | 5/1981 | Fukuda | 174/72 B |

*Primary Examiner*—Roy N. Envall, Jr.
*Attorney, Agent, or Firm*—Fishman and Van Kirk

[57] ABSTRACT

A bus bar having a high distributed capacitance includes plural ceramic plates sandwiched between flat conductors and insulated therefrom by a non-conductive binder. Electrical connectors between the conductors and metallized coatings on the adjacent sides of the plates is established by bridging the binder layers with conductive material which contacts exposed edge portions of the conductors.

19 Claims, 13 Drawing Figures

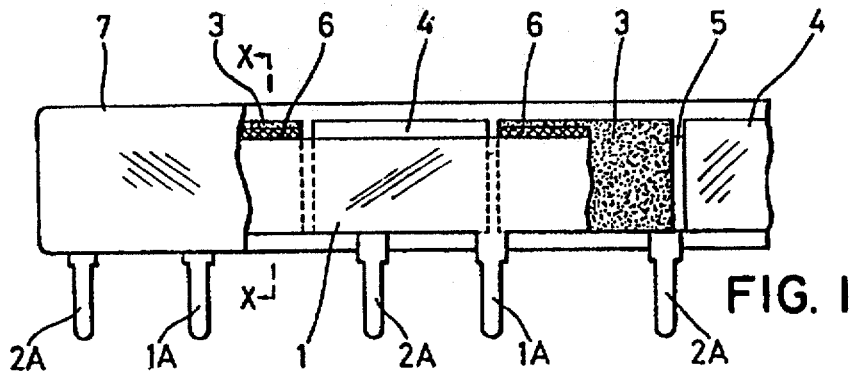
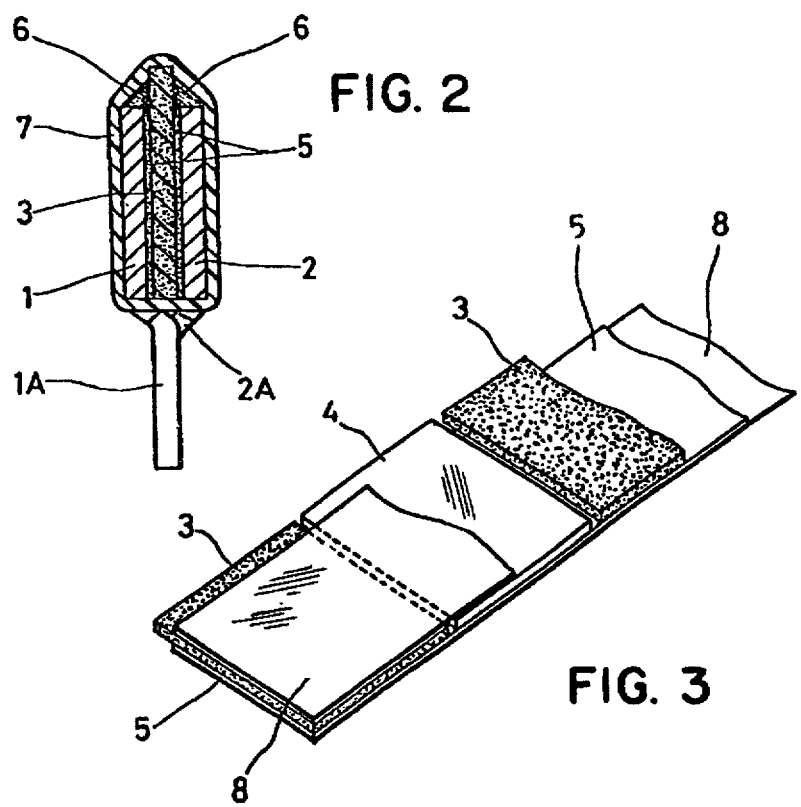

HIGH CAPACITANCE BUS BAR AND METHOD OF MANUFACTURE THEREOF

BACKGROUND OF THE INVENTION (1) Field of the Invention

The present invention relates to bus bars and particularly to miniaturized bus bars having a low characteristic impedence with low inductance and high distributed capacitance. More specifically, this invention is directed to methods for the production of miniaturized bus bars having plural dielectric members, and particularly relatively fragile ceramic wafers, disposed between a pair of bus conductors. Accordingly, the general objects of the present invention are to provide novel and improved articles and methods of such character.

(2) Description of the Prior Act

Multiconductor bus bars of the type which include either flat plate capacitors or discrete dielectric elements positioned between parallel conductors are known in the art. Such bus bars are characterized by a low characteristic impedance, low inductance and high distributed capacitance. These characteristics are highly desirable, and in many cases essential, to protect electronic circuit components from disturbing influences such as high frequency influences such as high frequency noise. The aforementioned characteristics of bus bars of this type; i.e., bus bars with discrete elements positioned between the parallel conductors; are superior to those of prior laminated bus bars of the type wherein the conductors were separated by a dielectric film or films. However, because of the increased number of individual elements which must be handled, and especially because of the fragile nature of the thin ceramic wafers which are preferred dielectric elements, bus bars of the type being discussed have been comparatively expensive to produce.

SUMMARY OF THE INVENTION

The present invention overcomes the above briefly discussed deficiencies and disadvantages of the prior art by providing novel and improved laminated bus bars of the type which includes plural discrete dielectric elements. The present invention also encompasses a unique and economical method for the manufacture of the said laminated bus bars.

In accordance with the present invention, a bus bar is characterized by at least a pair of parallel flat conductors. Plural wafers of dielectric material, ceramic chips for example, are embedded in an insulating binder and positioned between the conductors. The dielectric wafers will initially be electrically isolated from the conductors by the binder. The dielectric wafers and the conductors will be electrically connected such that the bus bar forms a capacitor, or more precisely a plurality of parallel capacitors, with the bus conductors defining the capacitor plates. After establishing electrical connection between each of the bus conductors and the side of the dielectric wafer adjacent thereto, the entire bus bar may be encapsulated in a suitable insulating material.

In accordance with a first embodiment of the invention, the dielectric wafers are of greater width than the conductors and thus extend outwardly with respect to at least first edges thereof. The electrical connection between the conductors and the adjacent sides of the dielectric wafers is accomplished by forming a bead of solder or other conductive material on the shoulders defined by the conductor edges where the dielectric wafers extend outwardly therefrom. The beads of conductive material will bridge the insulating binder in which the dielectric wafers are embedded.

In accordance with a second embodiment of the invention, the dielectric wafers are of the same width as the conductors and the conductors and insulating binder are cut away in regions, preferably elongated regions at an edge of the conductor, to expose areas on opposite faces of the dielectric wafer. A suitable conductive material is subsequently flowed into these cut-out regions.

In accordance with yet another embodiment of the invention the conductors and insulating binder are removed in plural spaced regions which are in registration with each dielectric wafer, for example by drilling, and these plural regions are filled with conductive material.

A preferred assembly technique in accordance with the present invention consists of producing a subassembly wherein a layer of insulating binder having a strip of release paper on a first side thereof is formed. The dielectric wafers are positioned on the exposed surface of the binder. Subsequently, a second layer of binder, also carried by a strip of release paper, is positioned over the dielectric wafers. It is to be noted that, depending upon the required capacitance of the bus bar, the dielectric wafers may be comprised of different materials. For example, a bus bar may include alternating ceramic chips and spacers of an easier to handle dielectric material.

Whether it is desired to complete assembly of a bus bar in accordance with the present invention, the release paper is removed from the outwardly facing surfaces of the layers of binder, copper foil conductors are positioned over the binder and the resulting laminate is hot pressed in order to bond the elements to one another and cure the binder. Subsequently, the electrical connections between the conductors and the dielectric wafers will be established, employing one of the techniques described above, and the bus bar may then be encapsulated in a suitable insulating material. In the case where the bus bar includes both ceramic chips and insulating spacers comprised of a different material, such spacers having the same thickness as the ceramic chips, electrical connection will typically be established only between the conductors and the ceramic chips.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a top plan view, with elements partly broken away, of a laminated bus bar in accordance with a first embodiment of the present invention;

FIG. 2 is an enlarged view, taken along the line X—X of FIG. 1, of the bus bar of FIG. 1;

FIG. 3 is a perspective view, with elements partly broken away, showing an intermediate employed in the manufacture of the bus bar of FIGS. 1 and 2;

DESCRIPTION OF THE PREFERRED EMBODIMENT

Figure 4A:
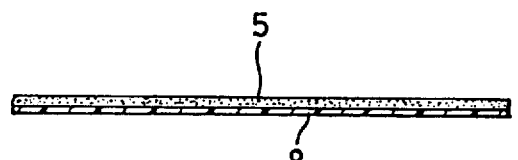
FIGS. 4A through 4F are cross-sectional side elevation views, on an enlarged scale, of the bus bar of FIGS. 1 and 2 in various stages of manufacture.
Figure 4B:
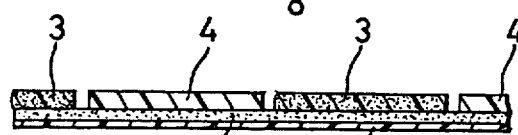
Figure 4C:
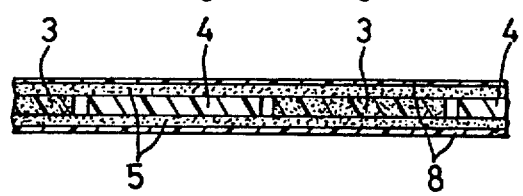
Figure 4D:
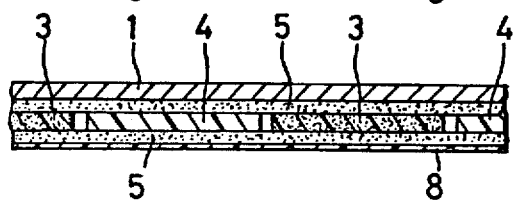
Figure 4E:
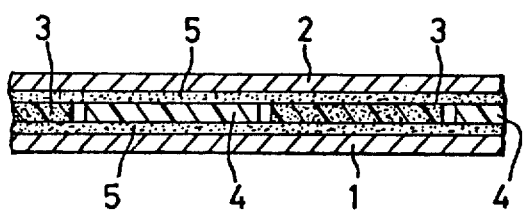
Figure 4F:
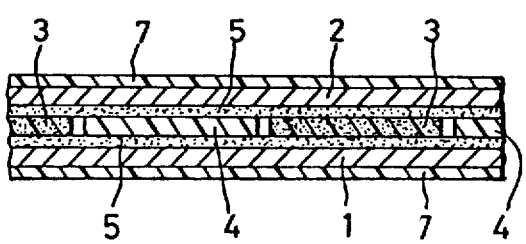

With reference jointly to FIGS. 1-3 a bus bar in accordance with a first embodiment of the present invention employs a pair of oppositely disposed parallel conductors 1 and 2. Conductors 1 and 2 would typically be formed from a copper foil or other thin copper sheet and will respectively have, extending outwardly from aligned first edges thereof, terminals or tabs 1A and 2A. Conductors 1 and 2 are separated by wafers or plates 3 and 4 which are embedded in an insulating binder 5. The binder 5 is bonded to the conductors and thus holds the laminate together. In the embodiment disclosed in FIG. 1, the wafers 3 will be comprised of thin plates of a ceramic material having the opposite faces thereof metallized and having the desired dielectric properties. The wafers 4 will comprise spacers which have the same thickness as the ceramic plates but which are less fragile and thus easier to handle. It will be understood that the choice of materials for wafers 3 and 4 and the dimensions thereof will be a function of the desired electrical characteristics of the bus bar and, in some instances, all of the wafers 3 and 4 may be comprised of the same ceramic material. As shown in FIGS. 1 and 3, the ceramic plates 3 and spacers 4 are arranged in alternating fashion and are aligned along the length of the bus bar. Spaces are left between adjacent wafers 3 and 4 to accommodate dimensional changes which may occur during the bonding process wherein heat and pressure is applied to cure the binder.

The embodiment of the invention represented by FIGS. 1-3 is characterized by the fact that the ceramic plates 3, and possibly also the spacers 4, extend outwardly beyond at least a first edge of the conductors 1 and 2. This arrangement may best be seen from FIG. 2. After bonding of the conductors to the binder 5, the metallized ceramic plates will be insulated from the conductors by means of the binder. Portions of the planar oppositely disposed faces of the ceramic plates will, where the plates extend outwardly past the edges of the conductors, be exposed. The conductors are electrically connected to the metallized coatings on respective oppositely disposed sides of the ceramic plates by means of forming beads 6 of solder or other flowable electrical conductive material on the shoulders defined by the edges of conductors 1 and 2, where the ceramic plates extend outwardly therefrom, as shown in FIG. 2. These beads 6 of conductive material will bridge the insulating binder 5.

Figure 7:
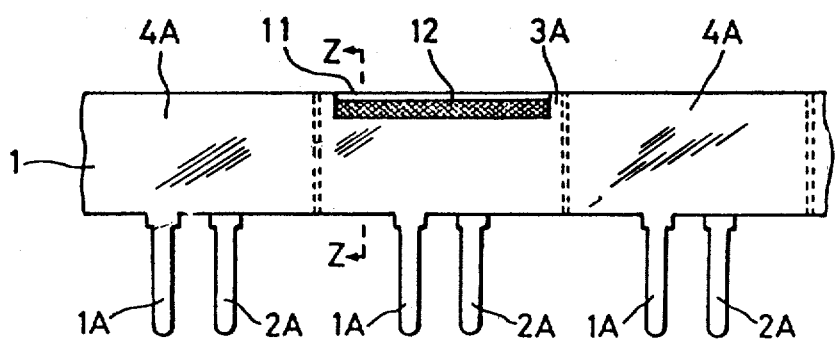
FIG. 7 is a partial plan view of yet another embodiment of a bus bar in accordance with the present invention.

After the assembly of the bus bar has been completed, by application of the beads of conductive material 6, it is usually desirable to hermetically encapsule the bus bar assembly by means of forming an insulating coating 7 thereabout. In one embodiment the coating 7 is formed by uniformly applying a resin in powdered form and subsequently heating the bus bar to melt and cure the resin. The resin may, for example, be a polyester, acrylic or epoxy. As shown in FIG. 7, it is usually customary to bend the terminals 1A and 2A such that all of the terminals extend outwardly from the bus bar in the same plane. This would typically be accomplished by bending the terminals at their roots such that all of the terminals lie in the plane of the wafers 3 and 4. The bending of the terminals may be performed at any stage during the assembly process and will typically occur immediately prior to application of the protective coating 7.

The ceramic plates 3 are thin and very fragile. The assembly technique in accordance with the present invention facilitates the handling of these plates. Referring to FIG. 3, and as will be described in greater detail below in the discussion of FIG. 4, a subassembly comprising the binder 5 and wafers 3 and 4 is formed and protected on opposite sides by means of strips of release paper 8. When it is desired to complete assembly of the bus bar, the release paper is removed and replaced by conductors 1 and 2 and the conductors are subsequently bonded to the resin by means of the application of heat and pressure. As mentioned above, during the course of preparation of the subassembly of FIG. 3, depending upon the electrical requirements of the bus bar, the spacer wafers 4 may be replaced by ceramic plates 3 or the wafers 3 and 4 may be of different size.

Referring now to FIG. 4, the fabrication of a bus bar in accordance with a preferred embodiment of the present invention is depicted. As a first step, as represented at (1), a "tape" of the non-conductive binder 5 is laminated with a strip of release paper 8. Next, as depicted at (2), the ceramic plates 3 and spacers 4 are positioned on the exposed surface of binder 5 in alternating fashion. A narrow gap is left between the adjacent wafers 3 and 4 in order to compensate for shrinkage of binder 5 during subsequent curing thereof. As shown at step (3) of FIG. 4, a second binder-release paper laminate is prepared and applied over the wafers 3 and 4; the binder adhering to the surfaces of the wafers. Referring back to FIG. 3, in the assembly process being described the width of the layers of binder 5 and the release paper 8 will be the same while the ceramic plates 3, and usually also the spacers 4, will extend outwardly from a first side edge of the binder-tape laminates.

When final assembly is desired, as shown in steps (4) and (5) of FIG. 4, the release paper 8 will be removed from the opposite sides of the subassembly depicted in step (3) and conductors 1 and 2 will be positioned in contact with binder 5. The conductors 1 will typically have length and width dimensions which are the same as the binder 5. After application of the conductors, the bus bar is hot pressed in order to cure the binder and strongly bond the binder to the wafers 3 and 4 and the conductors 1 and 2. Next, the beads of conductive material 6, which may be seem from FIGS. 1 and 2, are applied to establish electrical contact between the conductors 1 and 2 and respective adjacent metallized faces on the ceramic plates 3. Finally, the assembly of the bus bar is completed by forming the encapsulating layer of insulating resin 7 as indicated in step (6) of FIG. 4.

Figure 5:
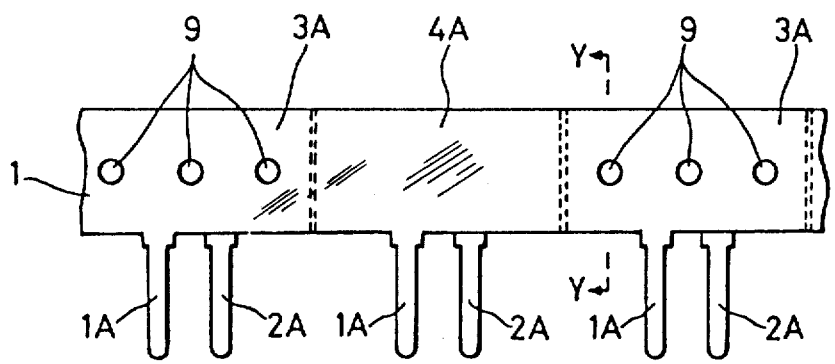
FIG. 5 is a partial plan view of a bus bar in accordance with a second embodiment of the present invention.
Figure 6:
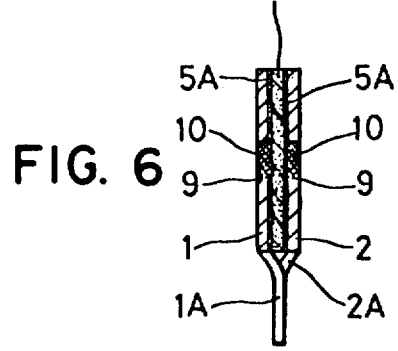
FIG. 6 is a cross-sectional view, taken along the line Y—Y of FIG. 5, of the bus bar of FIG. 5.

Referring simultaneously to FIGS. 5 and 6, a second embodiment of the present invention is assembled in the same manner as described above with the exception that the ceramic plates 3A, and also the spacers 4A, are of the same width as the conductors 1 and 2. In the embodiment of FIGS. 5 and 6 the conductors and binder are provided with aligned holes 9 and, after lamination, the holes 9 are filled with a conductive material 10. In the FIG. 5 embodiment, there are three of the holes 9, linearly aligned along the length of the conductor, in registration with each side of each of the ceramic plates 3A. The bus bar of FIGS. 5 and 6 will tyically, subsequent to application of conductive material 10, be encapsulated as discussed above.

Figure 8:
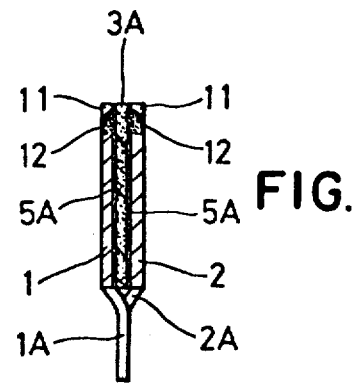
FIG. 8 if a cross-sectional view, taken along line Z—Z of FIG. 7, of the bus bar of FIG. 7.

The bus bar of FIGS. 7 and 8 is assembled in the same manner as discussed above with respect to FIGS. 5 and 6; i.e., the wafers 3A and 4A have the same width dimension as the conductors. In the embodiment of FIGS. 7 and 8 the conductors and binder 5A are cutaway in elongated regions 11, which are preferably along an edge of the conductors, so as to provide shoulders similar to those resulting from the extension of the ceramic plates beyond the edges of the conductors as described above in the embodiment of FIGS. 1-4. A bead of conductive material 12 is deposited on each of the shoulders; i.e., in each of the cutouts 11; to establish the electrical connections between the conductors and the metallized ceramic plates.

As will be obvious to those skilled in the art, the present invention provides an economical method for the fabrication of bus bars of the type wherein discrete elements having a very high dielectric content are sandwiched between the bus conductors. The present invention also provides the advantage of being able to encapsulate a bus bar having a high distributed capacitance easily and effectively since such encapsulation may be achieved employing a powdered resin.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of forming a bus bar including the steps of:
    positioning a first plurality of flat wafers comprised of a dielectric material having metallized faces in spaced-apart aligned relationship on an elongated strip of nonconductive uncured binder with first faces of the wafers in contact with the binder;
    applying a second strip of the binder over the wafers and in contact with second faces thereof;
    applying an elongated conductor to the exposed surfaces of each of the binder strips;
    bonding the conductor and the wafers to the binder to form an assembly wherein the conductors are electrically insulated from the wafers by the binder; and
    establishing electrical connection between each of the conductors and the adjacent face of the wafers to thereby define a plurality of parallel capacitors.

2. The method of claim 1 wherein the wafers of said first plurality are comprised of a ceramic material and wherein said method further comprises:
    alternating plates of a second dielectric material with said ceramic wafers.

3. The method of claim 1 wherein said ceramic wafers are of greater width than the conductors and binder strips and wherein the step of establishing electrical connection comprises:
    forming a bead of conductive material along edges of the conductors in regions where the ceramic wafers extend outwardly therefrom, the beads of conductive material bridging said strips of binder.

4. The method of claim 1 wherein the ceramic wafers have the same width as the conductors and binder strips and wherein the step of establishing electrical connection comprises:
    providing at least a first aperture through the conductors and binder strips at each side of each ceramic plate; and
    filling said apertures with conductive material.

5. The method of claim 1 wherein the ceramic plates have the same width as the conductors and binder strips and wherein the step of establishing electrical connection comprises:
    forming aligned cut-out regions along first edges of each of the conductors and binder strips at places in registration with each of said ceramic plates; and
    depositing conductive material in each of said cut-out regions on edge portions of the conductors, said conductive material bridging the binder strips.

6. The method of claim 1 further comprising the step of:
    encapsulating the bus bar in a non-conductive resinous material except in terminal regions.

7. The method of claim 6 wherein the step of encapsulating comprises:
    coating the bus bar with a resinous material in powder form; and
    heating the coated powder to melt and cure the resin.

8. The method of claim 6 wherein said ceramic wafers are of greater width than the conductors and binder strips and wherein the step of establishing electrical connection comprises:
    forming a bead of conductive material along edges of the conductors in regions where the ceramic wafers extend outwardly therefrom, the beads of conductive material bridging said strips of binder.

9. The method of claim 6 wherein the ceramic wafers have the same width as the conductors and binder strips and wherein the step of establishing electrical connection comprises:
    providing at least a first aperture through the conductors and binder strips at each side of each ceramic plate; and
    filling said apertures with conductive material.

10. The method of claim 6 wherein the ceramic plates have the same width as the conductors and binder strips and wherein the step of establishing electrical connection comprises:
    forming aligned cut-out regions along first edges of each of the conductors and binder strips at places in registration with each of said ceramic plates; and
    depositing conductive material in each of said cut-out regions on edge portions of the conductors, said conductive material bridging the binder strips.

11. The method of claim 8 wherein the step of encapsulating comprises:
    coating the bus bar with a resinous material in powder form; and
    heating the coated powder to melt and cure the resin.

12. The method of claims 9 wherein the step of encapsulating comprises:
    coating the bus bar with a resinous material in powder form; and
    heating the coated powder to melt and cure the resin.

13. The method of claim 10 wherein the step of encapsulating comprises:
    coating the bus bar with a resinous material in powder form; and
    heating the coated powder to melt and cure the resin.

14. The method of claim 11 wherein the wafers of said first plurality are comprised of a ceramic material and wherein said method further comprises:

alternating plates of a second dielectric material with said ceramic wafers.

15. The method of claim 12 wherein the wafers of said first plurality are comprised of a ceramic material and wherein said method further comprises:
alternating plates of a second dielectric material with said ceramic wafers.

16. The method of claim 13 wherein the wafers of said first plurality are comprised of a ceramic material and wherein said method further comprises:
alternating plates of a second dielectric material with said ceramic wafers.

17. The method of claim 1 further comprising:
forming a laminate of a strip of binder material and a strip of release paper prior to positioning the wafers of dielectric material on the binder; and wherein the step of applying a second strip of binder over the wafers includes:
forming a second laminate of binder and release paper; and wherein the step of applying the conductors to the binder strips includes:
removing the strips of release paper.

18. A bus bar comprising:
at least a pair of elongated, flat, parallel conductors;
a layer of insulating material bonded to facing surfaces of each of said conductors;
a plurality of flat rectangular dielectric elements sandwiched between said layers of insulating material, said dielectric elements having oppositely disposed metallized faces and being spacially separated;
means establishing electrical connection between an exposed edge portion of each of said conductors and an adjacent metallized face of said dielectric elements, said connection establishing means bridging the layers of insulating material.

19. The bus bar of claim 18 wherein the dielectric elements extend outwardly from first edges of said conductors whereby shoulders are defined by said conductor edges and wherein said connection establishing means comprises a bead of conductive material applied to said conductor edge defined shoulders.

* * * * *